(12) United States Patent
Biskeborn et al.

(10) Patent No.: US 9,691,414 B1
(45) Date of Patent: Jun. 27, 2017

(54) TAPE HEAD WITH NARROW SKIVING EDGES FITTED TO TRANSDUCERS

(71) Applicant: International Business Machines Corporation, Armonk, NY (US)

(72) Inventors: Robert G. Biskeborn, Hollister, CA (US); Johan B. C. Engelen, Zurich (CH); Mark A. Lantz, Thalwil (CH); Hugo E. Rothuizen, Oberrieden (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/201,074

(22) Filed: Jul. 1, 2016

(51) Int. Cl.
*G11B 5/00* (2006.01)
*G11B 5/008* (2006.01)
*G11B 5/187* (2006.01)

(52) U.S. Cl.
CPC ........ *G11B 5/00813* (2013.01); *G11B 5/1871* (2013.01)

(58) Field of Classification Search
CPC ....... G11B 5/187; G11B 15/00; G11B 15/005; G11N 5/187; G11N 15/00; G11N 15/005
USPC ..................................................... 360/122
See application file for complete search history.

(56) References Cited

U.S. PATENT DOCUMENTS

| 5,652,015 | A | 7/1997 | Aboaf et al. |
|---|---|---|---|
| 6,021,013 | A | 2/2000 | Albrecht et al. |
| 6,947,256 | B2 | 9/2005 | Biskeborn et al. |
| 8,014,100 | B2 | 9/2011 | Biskeborn et al. |
| 8,542,460 | B2 | 9/2013 | Biskeborn |
| 9,159,359 | B2 | 10/2015 | Biskeborn |
| 2005/0168874 | A1* | 8/2005 | Biskeborn .............. G11B 5/584 360/241.1 |
| 2007/0030594 | A1* | 2/2007 | Biskeborn ............ G11B 5/3945 360/129 |
| 2015/0364154 | A1 | 12/2015 | Holmberg |

OTHER PUBLICATIONS

R. G. Biskeborn et al., Hard-disk-drive technology flat heads for linear tape recording, IBM Journal of Research and Development, vol. 47 Issue:4, pp. 385-400 (abstract only pp. 1-2).

(Continued)

*Primary Examiner* — Allen T Cao
(74) *Attorney, Agent, or Firm* — Daniel P. Morris; Otterstedt, Ellenbogen & Kammer, LLP

(57) ABSTRACT

A tape head includes a body, which includes a transducer. The transducer may be a read or write element, respectively configured so as for the tape head to read from or write to a tape, in operation. The body exhibits a tape-bearing surface, which is typically configured to face and interact with the tape, in operation. The tape head further includes a closure. The closure is fixed on a leading side or a trailing side of the body and includes a skiving edge vis-à-vis the transducer. The skiving edge is adjoined by non-skiving edges. Finally, the closure has a top surface that meets the skiving edge; the top surface is level with the tape-bearing surface. Also included are related devices; tape head apparatuses for recording and/or reproducing tapes, comprising such tape heads; and methods of fabrication thereof.

20 Claims, 6 Drawing Sheets

(56) References Cited

OTHER PUBLICATIONS

R. G. Biskeborn et al., Flat-profile tape recording head, IEEE Transactions on Magnetics, vol. 38 Issue:5, pp. 1919-1921 (abstract only pp. 1-2).

R. G. Biskeborn et al., Hard-disk-drive technology flat heads for linear tape recording, IBM Journal of Research and Development, vol. 47 Issue:4, pp. 385-400 (full article).

R. G. Biskeborn et al., Flat-profile tape recording head, IEEE Transactions on Magnetics, vol. 38 Issue:5, pp. 1919-1921 (full article).

* cited by examiner

TAPE HEAD WITH NARROW SKIVING EDGES FITTED TO TRANSDUCERS

BACKGROUND

The invention relates in general to the field of tape heads, tape head apparatuses for recording and/or reproducing tapes, comprising such tape heads, and methods of fabrication thereof. In particular, it concerns tape heads whose skiving edges are arranged vis transducers thereof and are adjoined by non-skiving edges.

Various data storage media or recording media such as magnetic tape, magnetic disks, optical tape, optical disks, holographic disks or cards, and the like are known which allow for storage and retrieval of data. In particular, in magnetic media, data are typically stored as magnetic transitions, i.e., they are magnetically recorded in the magnetic layer of the media. The data stored is usually arranged in data tracks. A typical magnetic storage medium, such as a magnetic tape, usually includes several data tracks. Data tracks may be written and read individually, or sets of data tracks may be written and read in parallel depending. Transducer (read/write) heads are positioned relative to the data tracks to read/write data along the tracks. To this aim, a tape drive head must locate each data track and accurately follow its path. To achieve this, servo techniques have been developed which allow for a precise positioning of the head relative to the data tracks. One such technique makes use of servo patterns, that is, patterns of signals or recorded marks on the medium, which are tracked by the head. The servo patterns are recorded on the recording medium such as to provide a position reference for the data tracks. In other words, a servo head reads a servo pattern, which is then interpreted by a servo channel into a position error signal (PES). The latter is then used to adjust the distance of the servo head relative to the servo pattern and thereby ensure a proper positioning of the transducers with respect to the set of data tracks.

Essentially two technologies have been developed for timing-based servo patterns. The first one makes use of surface thin film servo writers, as discussed in, e.g., U.S. Pat. No. 6,021,013. The second technology relates to so-called "pure thin film planar servo writers", see, e.g., U.S. Pat. No. 5,652,015, U.S. Pat. No. 6,947,256, and U.S. Pat. No. 8,014,100. Pure thin film planar servo writers potentially have several advantages over surface thin film servo writers, such as improved servo format quality, increased servo formatting speed, increased servo pattern design flexibility and reduced fabrication costs.

SUMMARY

According to a first aspect, the present invention is embodied as a tape head. The tape head comprises a body. The body includes a transducer, which may be a read or write element, respectively configured so as for the tape head to read from or write to a tape, in operation. The body exhibits a tape-bearing surface, meant to face and interact with the tape, in operation. The tape head further comprises a closure. The closure is fixed on a leading side or a trailing side of the body and comprises a skiving edge vis-à-vis the transducer. The skiving edge is adjoined by non-skiving edges. Finally, the closure has a top surface that meets the skiving edge; the top surface is level with the tape-bearing surface.

In preferred embodiments, a width of the skiving edge is at least equal to a width of the transducer, as measured along a lateral direction parallel to the tape-bearing surface and perpendicular to a longitudinal direction of circulation of the tape.

In embodiments, the non-skiving edges are respectively formed by two beveled or rounded portions of the closure, at each end of the skiving edge.

In other embodiments, the non-skiving edges are respectively formed by two recessed portions, at each end of the skiving edge, wherein an external surface of each of the recessed portions faces the tape, in operation, and is recessed with respect to the top surface of the closure.

In embodiments, the closure is monobloc. It may for instance comprise aluminum-titanium carbide.

In embodiments, the tape head may be provided with two closures, one on the leading side of the body and the other one on the trailing side of the body.

The tape head may comprise two or more transducers. In such cases, the closure preferably comprises two or more skiving edges vis-à-vis the two or more transducer, respectively. Again, each of the two or more skiving edges adjoined by non-skiving edges.

In preferred embodiments, the tape head is a planar tape head, i.e., the transducer is an in-plane transducer, having top poles extending in-plane with the tape-bearing surface. The transducer may for instance be a servo writer.

The invention may be embodied as tape head apparatus for recording and/or reproducing multi-track tapes, comprising a tape head such as described above.

According to another aspect, the invention is embodied as a method of fabrication of a tape head. The method first comprises providing a substrate and patterning a hard mask on a first portion of the substrate. Then, a photoresist is deposited on a second portion of the substrate. The second portion includes (is larger than) said first portion. The photoresist is deposited in such a way that a front of the photoresist will substantially meet a front edge of the patterned hard mask. This front edge extends along a lateral direction of the substrate, the lateral direction parallel to the tape-bearing surface and perpendicular to a longitudinal direction of circulation of the tape. Next, a topography of the reflowed photoresist is transferred into the substrate. This way, a substrate is obtained, which has a skiving edge extending along said lateral direction and is adjoined by non-skiving edges. The substrate obtained forms a closure having a top surface meeting the skiving edge. Finally, the closure is fixed to the body of the tape head. The closure is fixed on the leading side or the trailing side of the body, so as for the top surface of the closure to be level with the tape-bearing surface and the skiving edge to be vis-à-vis the transducer.

Devices, apparatuses, and fabrication methods embodying the present invention will now be described, by way of non-limiting examples, and in reference to the accompanying drawings.

BRIEF DESCRIPTION OF THE DRAWINGS

FIGS. 1-2 are exploded views, whereas FIG. 3 shows a closure affixed to a tape head body having two transducers;

Figure 1:
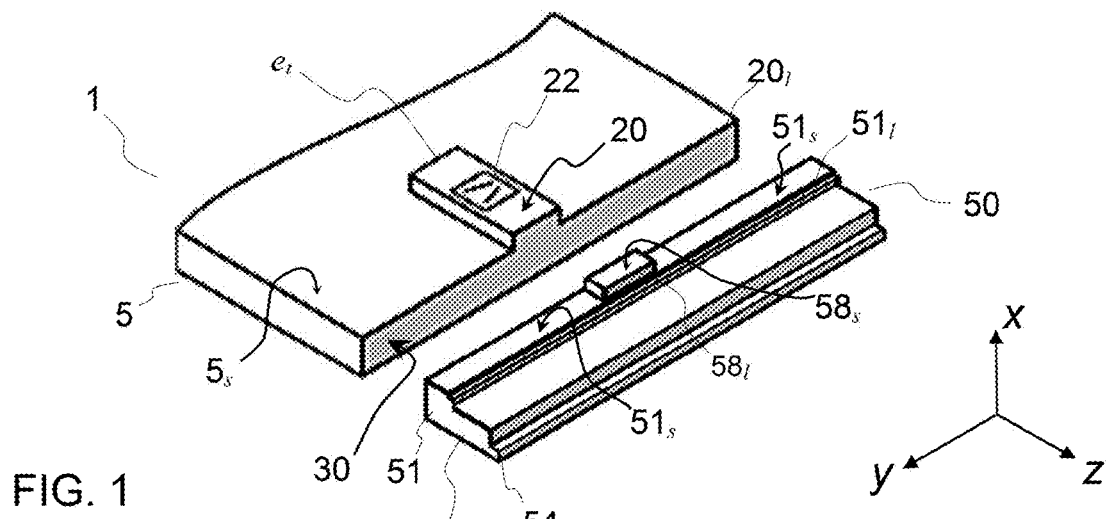
FIGS. 1-3 are 3D views of planar tape heads (servo writers), according to various embodiments. In each case, the head comprises a monobloc closure, structured so as to comprise a narrow skiving edge extending vis-à-vis a transducer of the head.

The accompanying drawings show simplified representations of devices or parts thereof, as involved in embodiments. Technical features depicted in the drawings are not to scale. In particular, the scales assumed for axes x, y and z may differ. For example, in FIGS. 3 and 4, dimensions of the closure along axis z are exaggerated, for the depiction purposes. In addition, the deformations of the tape are also exaggerated in FIGS. 6 and 7 and the tape is, on purpose, represented away from the tape-bearing surface, for the clarity of the depiction. Similar or functionally similar elements in the figures have been allocated the same numeral references, unless otherwise indicated.

DETAILED DESCRIPTION OF EMBODIMENTS OF THE INVENTION

As it can be realized, the second technology ("pure thin film planar servo writers") evoked in the background section may substantially suffer from friction and wear. Friction is problematic as it results in velocity variations during servo formatting that cause written-in velocity noise and degrade servo performance. Wear of the servo writer is also problematic as it limits the useful lifetime of a servo write head.

The wear robustness of a planar tape head can be significantly improved by mounting a hard ceramic "closure" on the leading edge (for asymmetrically wrapped heads with a trailing edge wrap angle of <0 degrees) or on both the leading and trailing edges for heads used in combination with a positive wrap angle on both the leading and trailing edges. In order to assure good contact between the tape and planar servo writer, the skiving edge should be sharp and the tape-bearing surfaces of the closure(s) and the planar head should be co-planar. Such closures are already known from their use in flat profile read/write heads in tape drives (see "Hard-disk-drive technology flat heads for linear tape recording" R. Biskeborn and J. Eaton, IBM Journal of Research and Development, Volume: 47, Issue: 4 pp 385-400, and "Flat-profile tape recording head", R. Biskeborn and J. Eaton, IEEE Transactions on Magnetics, Volume: 38, Issue: 5, pp 1919-1921).

Such heads are manufactured by gluing a closure on the edge of a tape head chip and lapping to achieve a flat planar tape-bearing surface. Good alignment (co-planarity) between the tape-bearing surface of the closure and the head chip is required to ensure good tape-head contact (i.e., a low spacing therebetween). For read/write heads, planarity can be achieved by lapping of the head chip and the closure to a flat surface. In addition to making the surfaces flat and planar, the lapping process has the added benefit of creating a sharp skiving edge on the closure.

However, as present Inventors have realized, such heads still suffer from friction. In addition, the above process is not suited for planar heads (because of the in-plane transducers) as the lapping process may damage the transducers. More generally, lapping may cause damages to a tape-bearing surface.

Having realized these potential issues, present inventors have developed methods for (pre)shaping the closure to achieve reduced friction between the tape and the tape-bearing surface. In addition, they have developed methods for mounting a closure onto a tape head, where the closure is profiled such as to make it possible to reach co-planarity with the surface of the tape bearing, without resorting to a lapping process.

The present solutions can notably find applications for planar servo writers (e.g., thin film planar servo writers). However, and the one skilled in the art may appreciate, the present solutions may potentially apply to any type of tape heads and, in particular, to planar tape heads for use in tape drives.

Referring generally to FIGS. 1-7, a first aspect of the invention is described, which concerns a tape head $1$-$1_c$.

Basically, the tape head comprises a body $5$, $5_a$, $5_b$. The body $5$, $5_a$, $5_b$ exhibits a tape-bearing surface $20$, which is the surface meant to contact the magnetic tape and interact therewith, to read from or write to the tape $10$ (see FIG. 6), in operation. Yet, as the skilled person knows, the tape-bearing surface $20$ is not necessarily in permanent physical contact with the tape. On the contrary, only fractions of the tape surface may be in actual contact, intermittently, with the tape-bearing surface $20$ of the head. The extent in which the tape contacts the tape-bearing surface depends on a number of parameters. For example, this depends on the actual type of tape used. The tape may for instance include bumps, which effectively increase the average tape-head spacing, as known per se. However, even intermittent, sporadic contacts between the tape-bearing surface and the tape suffice to create friction and accordingly cause wear.

Figure 2:
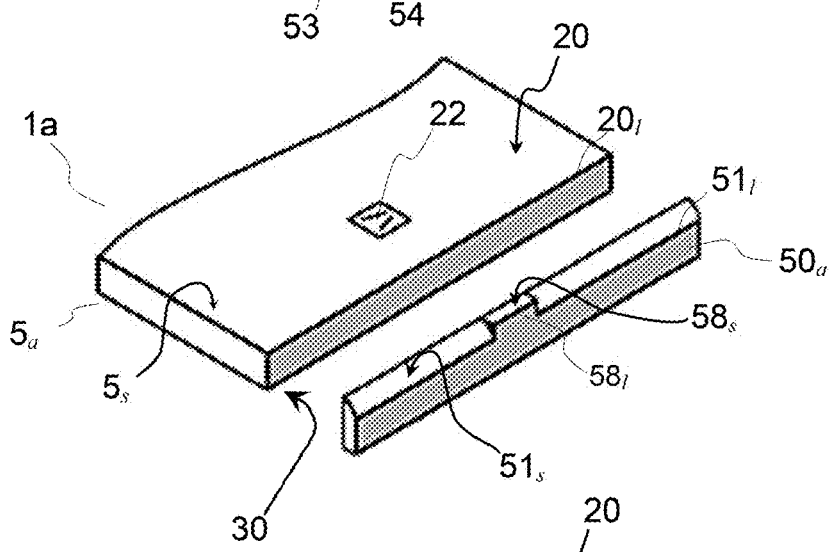
Figure 3:
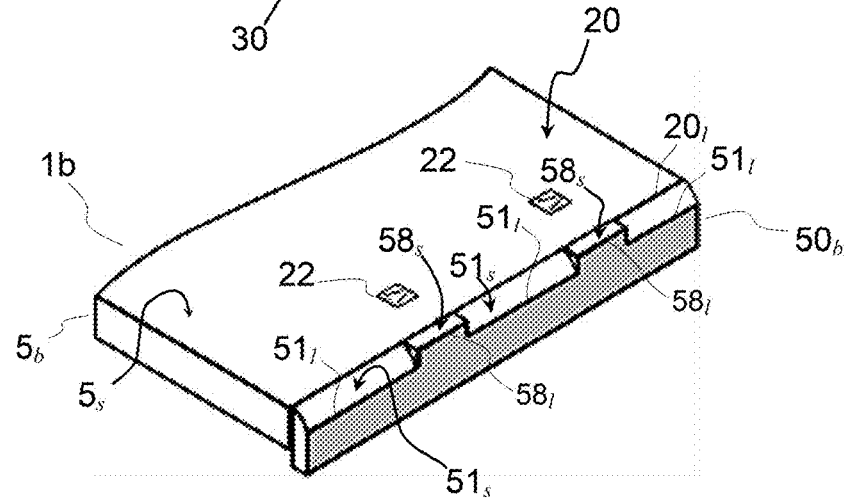

The tape-bearing surface is preferably planar (i.e., flat) and may be defined by a reduced surface portion $20$ surrounding the transducer $22$ and slightly protruding from a bearing surface $5_s$ of the body $5$, as assumed in FIG. 1, 4, 5. However, this need not necessarily be the case, as illustrated in FIGS. 2-3. In all cases, the tape-bearing surface $20$ defines a leading side $30$ and a trailing side (denoted by reference $30_c$ in FIG. 6). The leading side $30$ and a trailing side $30_c$ typically correspond to respective (vertical) surfaces $30$, $30_c$ of the body $5$ that adjoin, each, the tape-bearing surface $20$.

In addition, the body $5$, $5_a$, $5_b$ comprises one or more transducers $22$. Only one transducer $22$ is shown in the accompanying figures except in FIG. 3, for simplicity. However, a typical tape head will likely include a set of several transducers, and possibly of different types. The transducer(s) $22$ shown in FIGS. 1-7 may be a read or write element, i.e., an element configured in the tape head $1$-$1_c$ to allow the latter to read from or write to a tape $10$ (see FIG. 6), in operation.

Such a transducer is preferably partly buried in the body. The top poles $22_p$ (see FIG. 4 or 5) of the magnetic yoke of the transducer 22 may notably be in-plane with the tape-bearing surface 20, as assumed in the accompanying drawings. The top poles of the transducers are preferably mounted front-flush so as for the surface 20 to be essentially flush.

The tape head further comprises a closure 50-50$_c$. As illustrated in the accompanying drawings, a closure may be fixed on a leading side 30 (FIGS. 1-6), on a trailing side 30$_c$ or on both the leading side 30 and the trailing side 30$_c$ of the body 5 (as in FIG. 7, where the two closures slightly differ, for reasons discussed later). In general, such a closure comprises one or more (sharp) skiving edges 58$_l$, each arranged vis-à-vis a respective transducer 22 of the body 5, 5$_a$, 5$_b$, i.e., at the level of the transducer. Each skiving edge 58$_l$ is adjoined by non-skiving edges 51$_l$. Thus, the relative fraction of the skiving edge(s) with respect to the leading/trailing edges (as a whole) is reduced. Preferably, the lengths of the skiving edges matches the lateral dimensions of the opposite transducers, as for instance illustrated in FIGS. 1, 2, 4 and 5.

An "edge" as understood here refers to the outside (external) limit of an object portion, where two (transverse) surface portions meet. The skiving edges 58$_l$ are sharp and are located at the level of the top surface 58$_s$ (thus at a same level as the tape-bearing surface 20), whereas the non-skiving edges 51$_l$ are either rounded, beveled or otherwise blunt (i.e., less sharp than the skiving edges, as in FIGS. 2, 3) and/or are recessed with respect to the top surface 58$_s$ (and thus the tape-bearing surface), as in FIG. 1, 4 or 5.

A closure 50-50$_c$ otherwise shows a top surface 58$_s$ that meets the skiving edge 58$_l$. If the adjoining (non-skiving) surface portions 51$_s$ are not recessed with respect to the top surface 58$_s$, as in FIG. 2 or 3, then the top surface 58$_s$ may also merge with such surface portions 51$_s$ and therefore meet the non-skiving edge 51$_l$ too. Importantly, the top surface 58$_s$ is level with the tape-bearing surface 20.

Because (i) the top surface 58$s$ is co-planar with the tape-bearing surface 20 and (ii) the relative fraction of the skiving edge(s) is narrowed due to adjoining non-skiving edges, the present approach makes it possible to further reduce friction between the tape 10 and the tape-bearing surface 20 and, therefore, to reduce wear. Namely, a close contact between the tape and the tape-bearing surface is maintained only where necessary, i.e., at the level of the skiving-edges 58$_l$ (and the respective top surfaces 58$s$). Yet, the necessary geometry can easily be achieved thanks to the fact that skiving-edges and non-skiving edges are fabricated on a closure 50-50$_c$ that is initially separated from the body 5, 5$_a$, 5$_b$ and is subsequently mounted onto or fixed to the body 5, 5$_a$, 5$_b$.

In addition, and as seen in the accompanying drawings, the tape-bearing surface and adjoining closure(s) have a step-like cross-section, which allows the area of the tape head that comes into contact with the tape 10 to be effectively decreased, as only the area 20 touches the tape 10, in operation. Indeed, and as it can be realized, the total footprint of the head (exposed to the tape) cannot be indefinitely reduced, owing to wiring and other parts needed in the head, be it to electrically connect the transducers 22 to other components of a tape head apparatus (not shown). However, it is possible to trim the top portion of the tape head, e.g., by etching portions surrounding the intended contact surface 20. This way, one obtains a step-like structure (whereby only a residual surface 20 touches the tape 10), which makes it possible to reduce the effective contact area and, hence, to further reduce friction and wear. The minimal surface area 20 that can be achieved (to create a step-like profile) depends on the type and arrangement of transducers 22 utilized.

As illustrated in FIGS. 1-5, a width of the skiving edge is at least equal to a width of the transducer, to optimize the contact surface. For example, a skiving edge 58$_l$ may have a width slightly greater than the opposite transducer 22 (as in FIGS. 1, 2, 4 and 5). The width is measured along a lateral direction y, i.e., parallel to the plane of the tape-bearing surface 20 and perpendicular to the (average) longitudinal direction z of circulation of the tape 10. In variants, the skiving edge 58$_l$ opposite to a transducer 22 has a width substantially greater than that of this transducer 22, as illustrated in FIG. 3. The width of the skiving edge 58$_l$ may for instance be between 150% and 250% of the width of the transducer 22, to ensure good tape-head contact over the surface of the transducers.

Figure 4:
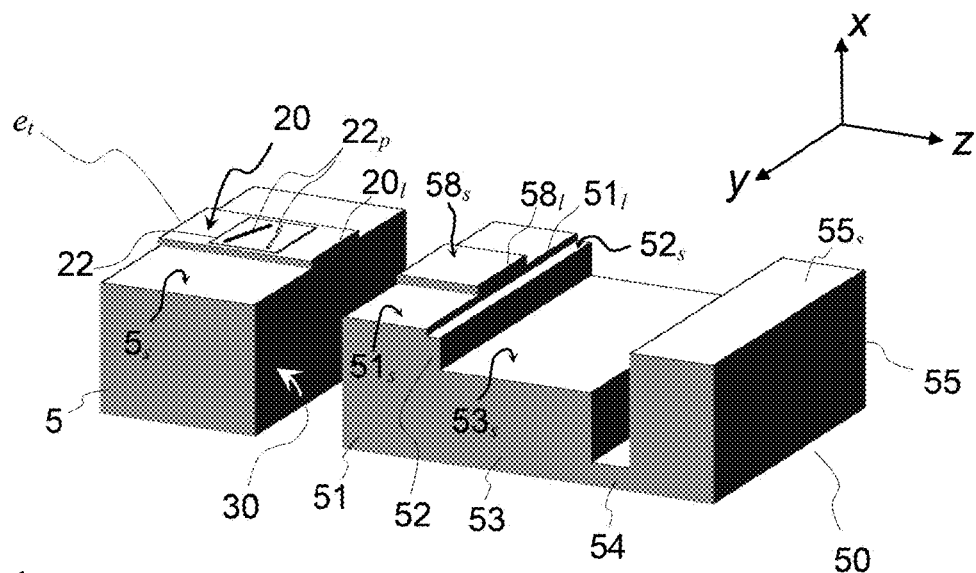
FIG. 4 is a, exploded 3D view of a planar tape head similar to that of FIG. 1, which can also be regarded as showing a closure not yet fixed to the body of the head. The closure has a U-shape to ease the fixation and ensure co-planarity of a top surface of the closure with the tape-bearing surface, as involved in embodiments.
Figure 5:
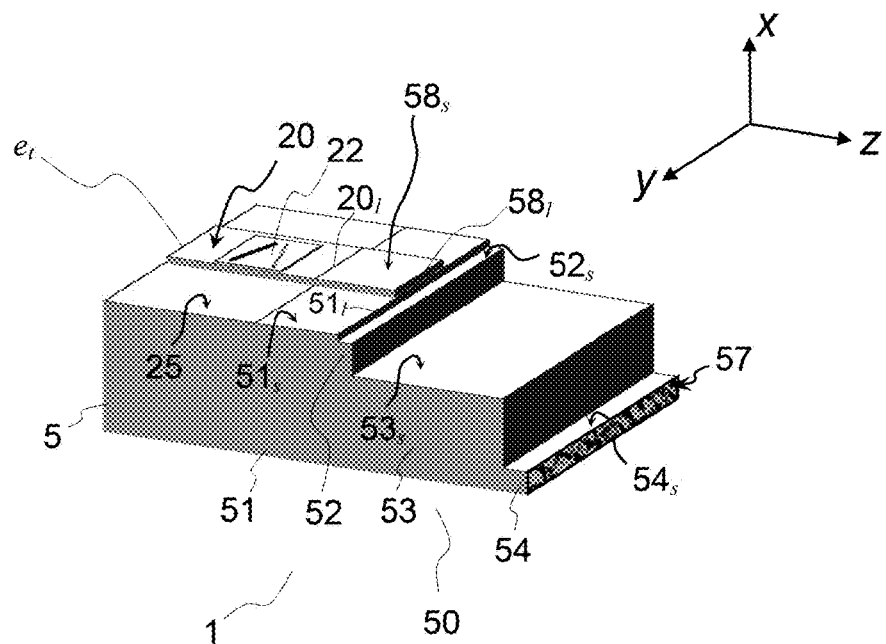
FIG. 5 illustrates the head of FIG. 4, wherein the closure has been fixed to the tape head body and a distal flank of the closure has been removed.

FIGS. 1, 4 and 5 depict embodiments wherein the non-skiving edges 51$_l$ are formed by (flat) recessed portions 51$_s$, at each end of a skiving edge 58$_l$. Such portions 51$_s$ are recessed with respect to the top surface 58$_s$ of the closure 50 (and thus, with respect to the tape-bearing surface 20 too). The external surface 51$_s$ of each of the recessed portions 51$_s$ faces the tape 10, in operation.

On the contrary, in embodiments such as depicted in FIGS. 2 and 3, the non-skiving edges 51$_l$ are formed by beveled or rounded portions 51$_s$ of the closure 50$_a$, 50$_b$. Beveled or rounded portions are provided at each end of a skiving edge 58$_l$. As it can be realized, beveled or rounded portions 51$_s$ further reduces friction (where no close contact is necessary). As seen in FIGS. 2 and 3, the beveled or rounded portions 51$_s$ may be flush with the tape-bearing surface 20 and the top surface 58$_s$ at the level of the upper interface between the closure 50$_a$, 50$_b$ and the body 5$_a$, 5$_b$. Yet, embodiments can be contemplated, wherein the beveled or rounded portions are slightly recessed with respect to the tape-bearing surface and the top surface (or even with respect to the bearing surfaces, in variants to embodiments such as in FIG. 2 or 3). This may be advantageous from the fabrication point-of-view.

In all cases (FIGS. 1-7), the closures may further exhibit a step-like profile in the plane (x, z), whereby (flat) areas 52$_s$ are recessed with respect to the tape-bearing surface 20 and the top surface 58$_s$ of the closure, as well as with respect to areas 51$_s$. Yet, such recesses can be suitably dimensioned (along x and z) to prevent the tape 10 to touch down on the recessed (flat) areas 52$_s$, in operation, as Inventors have further realized. This is discussed later in detail.

The closure 50-50$_c$ used herein are preferably monobloc, and appropriately structured to confer desired properties, in terms of (reduced) friction. Example of fabrication processes are discussed later. The closure 50-50$_c$ may notably comprises aluminum-titanium carbide, i.e., the closure may be structured from an aluminum-titanium carbide substrate, or AlTiC substrate (e.g., a wafer that essentially comprises Al, Ti and C elements, in an Al2O3-TiC composition). As known per se, photoresist patterns can easily be transferred into an AlTiC substrate, e.g., by reactive ion etching. Such a process results in clean step-like structures, as needed in embodiments.

Figure 6:
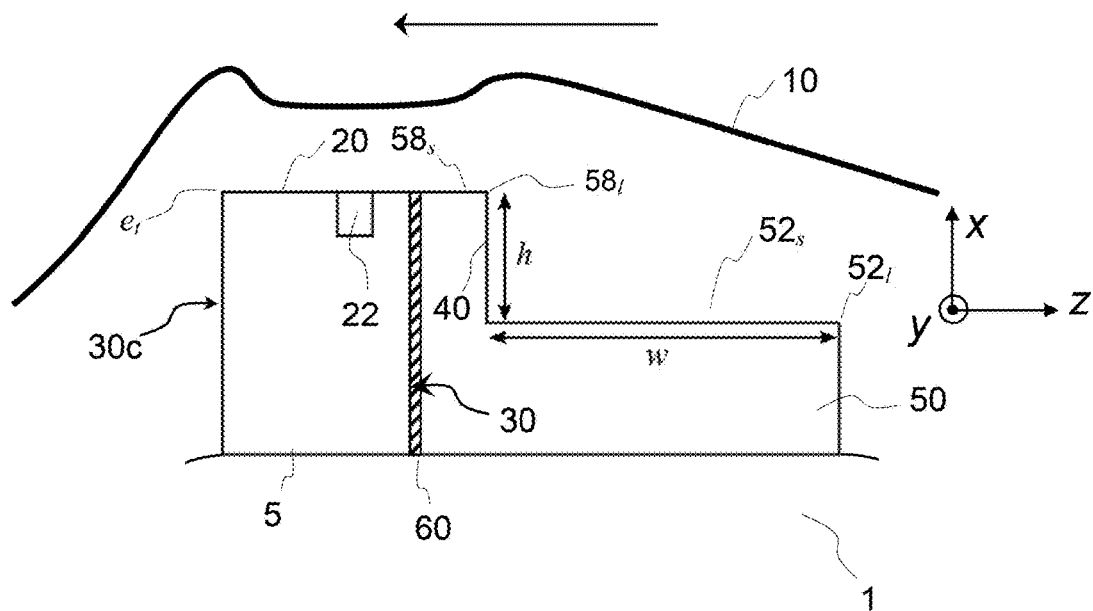
FIG. 6 is a 2D cross-sectional view of a portion of a tape head such as depicted in FIG. 1, cut through the plane (x, z) that intersects the transducer. In this cross-section plane, the top surface of the closure is level with the tape-bearing surface.
Figure 7:
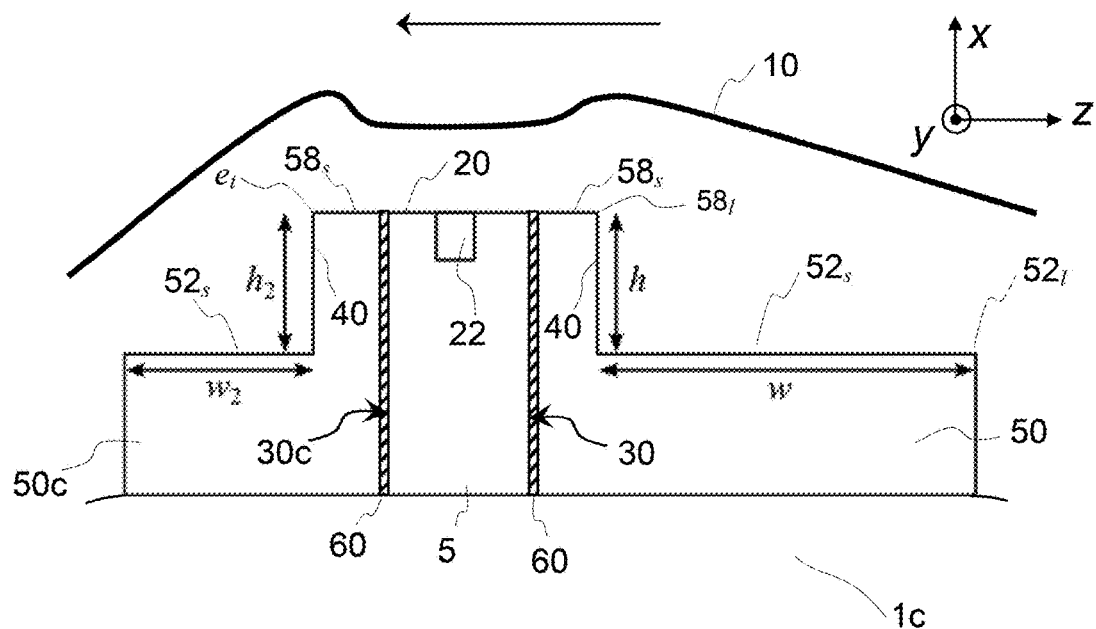
FIG. 7 shows a 2D cross-sectional view of an asymmetric tape head having two closures on each side of the transducer, according to other embodiments, wherein positive wrap angles α and β of the tape are assumed on both the leading and trailing edges.

FIG. 6 depicts a cross-sectional (partial) representation of the device of FIG. 1 or 5, wherein only one closure is affixed to the leading side 30 of the tape head body 5. In the embodiment of FIG. 7, the tape head 1$_c$ comprises two closures 50, 50$_c$. Here, a first closure 50 is fixed on the leading side 30 of the body 5, the second closure 50$_c$ being fixed on the trailing side 30$_c$. Still, and consistently with the present approach, each of the closures 50, $50_c$ comprises one or more skiving edges $58_l$ (each adjoined by non-skiving edges $51_l$) that extend, each, vis-à-vis a respective transducer 22. In addition, each of the closures 50, $50_c$ has a top surface $58_s$ (meeting a respective skiving edge $58_l$) that is level with the tape-bearing surface 20, on opposite sides thereof. Assuming positive wrap angles on both sides, the friction between the tape and the tape-bearing surface can be reduced, by trimming (now on each side) the upper portion of the tape head, i.e., the portion the closest to the tape, in operation, as discussed earlier.

Referring back to FIG. 3, it is understood that typical embodiments of a tape head as described above may actual comprise several transducers 22. Each closure involved may, in such cases, comprises two or more skiving edges $58_l$ vis-à-vis the transducer 22, for example in a one-to-one mapping. Yet, more sophisticated variants can be contemplated, where a larger skiving edge is arranged opposite to two or more transducers, whereas smaller skiving edges extend vis-à-vis respective ones of the remaining transducers. Part or all of the skiving edges may be adjoined by non-skiving edges $51_l$.

At present, dimensions of the structural features of the closures are discussed in detail. The embodiments of FIGS. 1, 4 and 5-7 involve flat, lateral portions $51_s$ that are recessed with respect to the top surface $58_s$ and the tape-bearing surface 20 (the recessed portions $51_s$ are not visible in FIGS. 6 and 7, due to the middle cross-sectional plane chosen for the cut). Now, each of the closures 50-$50_c$ depicted in FIGS. 1-7 may otherwise have a step-like cross-sectional profile, in the plane (x, z). Namely, the closures may exhibit, each, a riser 40 between two treads $58_s$, $52_s$, as respectively formed by the top surfaces $58_s$ and the recessed surface $52_s$ of the portion 52. In preferred embodiments, the surface $52_s$ is recessed from the surface $58_s$ by a distance h (see FIGS. 6, 7), whereas the width w of the recessed surface $52_s$ along direction z (parallel to the average direction of circulation of the tape) is chosen to ensure that a desired wrap angle can be obtained. E.g., for a given, desired wrap angle α, the ratio h/w should be larger than or equal to tan(α), else the tape may touch the surface $52_s$, or the edge $52_l$ it leads to, in operation. For instance, h=2 μm, and w=50 μm may typically be used. Smaller values of w (e.g., 10 or 20 μm) can nevertheless be obtained, at fabrication. The value of w is ideally as small as possible. The closure 50, $50_a$ is preferably fabricated from an AlTiC substrate, as discussed earlier.

Because of the riser 40, the recessed surface $52_s$ is recessed from the contact area 20+$58_s$ by a distance h that corresponds to the height of the riser 40, i.e., along x. The riser 40 and, more generally, the step-like structure $58_s$-40-$52_s$ can notably be obtained according to methods described later in reference to FIG. 9. Again, it is reminded that the drawings are not to scale.

However, and as it can further be realized, the surrounding surface portions $52_s$ cannot be too deeply recessed, else the wirings (needed to connect the transducers 22) and other sensitive parts possibly contained in the head may be affected. Thus, the distance h should ideally be as small as small as possible, to avoid damaging the tape head and to facilitate fabrication.

Still, the distance h cannot be too small either with respect to the width w of the recessed surface 30 (w extends along a direction parallel to the longitudinal direction z of circulation of the tape 10).

Figure 9:
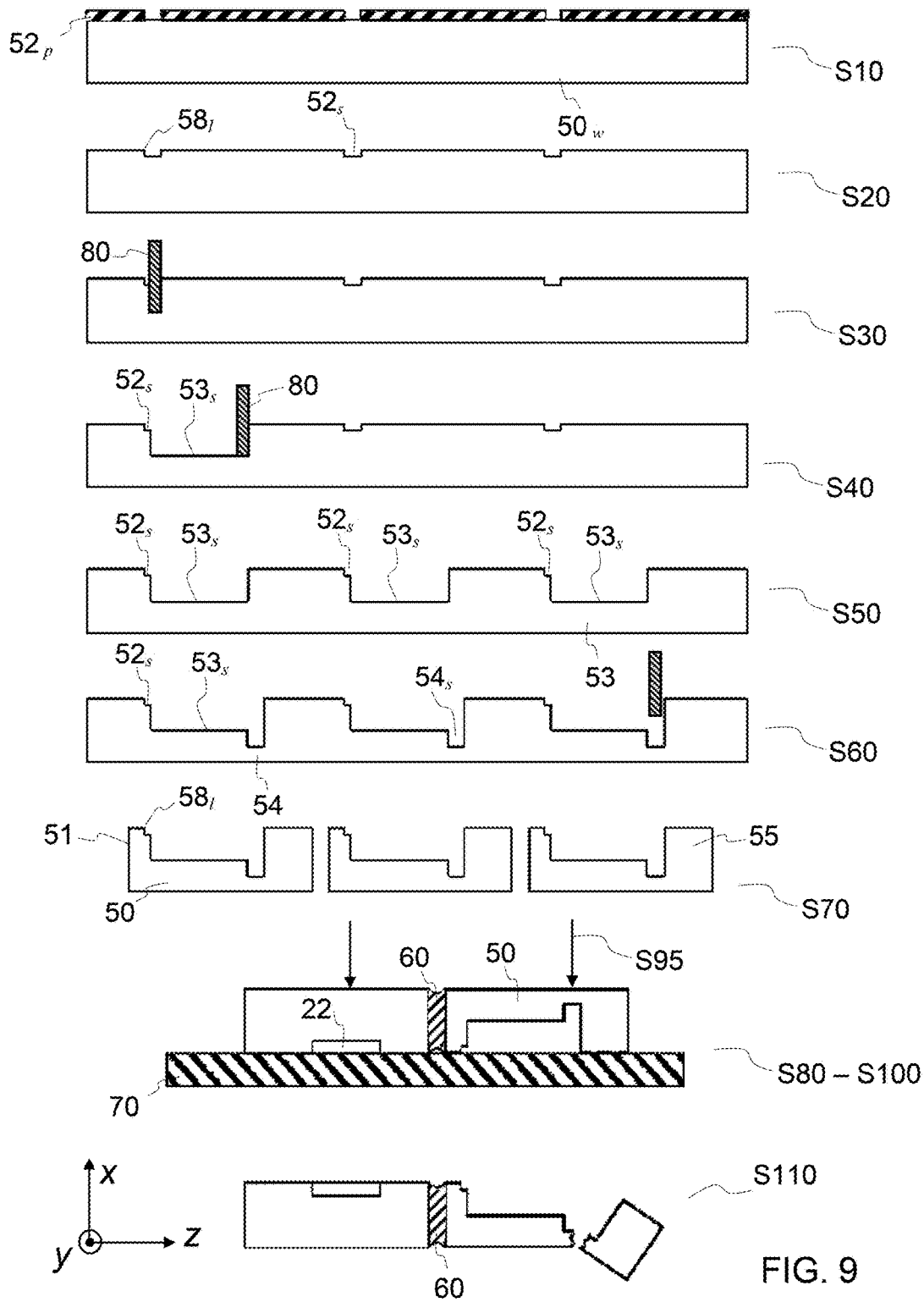
FIG. 9 is a sequence of cross-sectional views illustrating high-level fabrication steps of a tape head, involving a U-shaped closure such as depicted in FIG. 4, according to embodiments.

A suitable distance h is, in practice, preferably between 1 and 10 microns, to ease the transfer process, at fabrication (step S20, FIG. 9). More preferably, the distance h shall be between 3 and 7 microns. Suitable widths w for the recessed surface $52_s$ shall typically be between 10 and 50 microns.

Possible ranges of for dimensions for the head components follow:

- The length of the leading edge (i.e., formed by edges $51_l$ and $58_l$, along axis y) preferably corresponds to the whole length of the head (as assumed in FIG. 5) and is preferably larger than the width of the tape (e.g., 0.5 inch);
- The width of the recessed surface $52_s$ (along z) is preferably between 10 and 50 μm it is ideally as small as possible).
- The width of the top surface $58_s$ (along z) is preferably between 20 and 200 μm, and is more preferably larger than 100 μm so that the tape 10 may land on the closure.
- The total width of the connecting part 53 (along z) is preferably of (approximately) 2 mm;
- The width of the trench $54_s$ (along z) is preferably ~150 μm, depending on the saw blade width, see FIG. 9; and
- The width (along z) of the top surface $55_s$ of the distal flank 55 is preferably of ~200 μm.

As seen in FIGS. 6 and 7, present tape heads 1, 2 may exhibit one (FIG. 6) or two (FIG. 7) recessed surfaces $52_s$. In FIG. 7, the tape head $1_c$ exhibits two recessed surfaces $52_s$, i.e., one on the trailing side $30_c$ and one on the leading side 30 of the tape-bearing surface 20. The recessed $52_s$ surface on the trailing side $30_c$ is recessed from the tape-bearing surface 20 by a distance $h_2$ and has a width $w_2$ along z, $h_2$ and $w_2$ being here again appropriately chosen so as to prevent the tape (or at least substantially lower the chance for it) to be pushed back onto the recessed surface $52_s$ on the trailing side $30_c$, in operation of the tape head. Again, the distance $h_2$ shall advantageously be between 1 and 10 microns. The fabrication of the head will be facilitated if the distances h and $h_2$ are chosen equal and, a fortiori, if similar closures 50 and $50_c$ are used. Yet, asymmetric heads may be desired (as assumed in FIG. 7), depending on the desired wrapping of the tape 10.

Note that the above considerations as to the ratio h/w are formulated with respect to the step-like structure $58_s$-40-$52_s$. However, since a major portion of the leading edge may be formed by the step-like structure $51_s$-40-$52_s$, the same considerations may be used in respect of the ratio h'/w, where h' this time denotes the (vertical) distance between the surfaces $51s$ and the recessed surface $52_s$. I.e., one may already want to impose a ratio h'/w larger than or equal to tan(α), to prevent the tape from touching the surface $52_s$, in operation. Whether to do so depends also on the actual configuration of the portions 52s, which may be beveled or rounded, a thing that mitigates the risk of touch down.

Present tape heads are advantageously used in tape head apparatuses for recording and/or reproducing multi-track tapes. The present invention can accordingly be embodied as such an apparatus.

Figure 8:
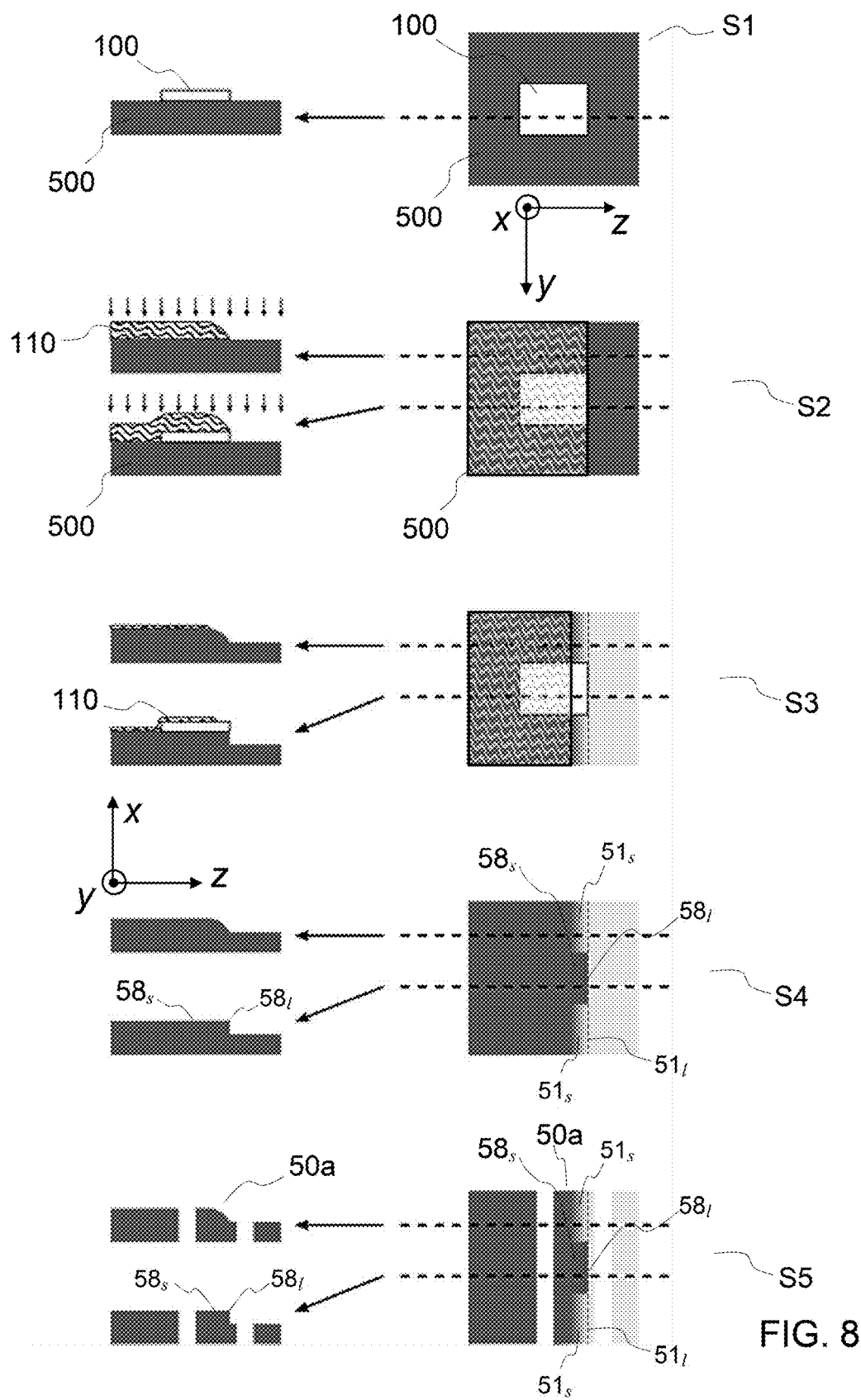
FIG. 8 shows a sequence of (partial) top views (right-hand side column) and corresponding cross-sections (left-hand side column) illustrating high-level fabrication steps of a tape head such depicted in FIG. 2 or 3, according to embodiments.

Referring now to FIG. 8, and according to another aspect, the invention can further be embodied as a method of fabrication of a tape head 1-$1_c$ such as described above.

Such a method makes use of a substrate 500, onto which a hard mask 100 is patterned (step S1, FIG. 8) on a first portion of the substrate 500. The hard mask can be patterned using, e.g., photolithography and etching processes.

Then, a photoresist 110 is deposited and, e.g., patterned S2 on a second portion of the substrate. The second portion includes said first portion, i.e., it is larger than the first portion (corresponding to the hard mask 100), especially on the lateral sides thereof (along axis y). As illustrated in FIG. 8, the photoresist 110 notably covers the hard mask 100 and lateral portions of the substrate 500 on opposite sides of the patterned hard mask. Yet, this process is performed so as for a front of the photoresist 110 (the front extending along axis y) to substantially meet the front edge of the patterned hard mask 100.

Next, the topography of the reflowed photoresist 110 is transferred S3, S4 into the substrate 500 Thanks to the hard mask 100, this makes it possible to eventually obtain S4-S5 a substrate 500 with a skiving edge 58$_l$ extending along the lateral direction y, and which is laterally adjoined by non-skiving edges 51$_l$. The substrate 500 obtained can otherwise be used as a closure, which, as per the fabrication steps described above, has a top surface 58$_s$ that meets the skiving edge 58$_l$.

Finally, the closure 50$_a$ can be fixed FIGS. 4-5 to the body 5 of the tape head. As described earlier, the body comprises a transducer 22 and exhibit a tape-bearing surface 20. When fixing the closure 50$_a$ (be it one the leading side 30 or the trailing side 30$_c$ of the body 5), care is taken so as for the top surface 58$_s$ of the closure to be level with the tape-bearing surface 20 and the skiving edge 58$_l$ to be vis-à-vis, i.e., opposite the transducer 22.

The same process can be applied to obtain and fix a closure having several skiving edges, arranged laterally along direction y. In this case, a respective number of hard masks 100 are patterned and a single layer of photoresist may be deposited over all the masks 100.

The transfer of the topography is typically performed by way of an etch process such as reactive ion etching. The hard mask material is preferably silicon dioxide, and is preferably deposited on top of an AlTiC substrate. In variants, the hard mask may for instance comprise titanium. More generally, it may comprise a material that is resilient against the reactive ion etching step, but that can be etched using another method such as wet etching so that the mask can be patterned.

The above method can advantageously be used to obtained rounded or beveled lateral portions. Namely, the deposited photoresist 110 may be heated (after or during deposition S2) so as to reflow it. As a result, and because of changes occurring in the surface tension of the material, the front of the reflowed photoresist 110 will exhibit a beveled or rounded front, as seen in step S2. Because of the hard mask, the beveled or rounded front will give rise to beveled/rounded portions 51$_s$ on opposite sides of the patterned hard mask, after the transfer S3, as seen at S4. Thus, the skiving edge 58$_l$ subsequently obtained is adjoined by two beveled or rounded portions 51$_s$, one at each end of the skiving edge 58$_l$. The beveled or rounded portions meet respective non-skiving edges on the right-hand side.

In embodiments, remaining parts of the photoresist 110 and the hard mask 100 are stripped, step S4, after the transfer and prior to fixing the closure. A monobloc closure can be obtained by stripping all the remaining parts of the photoresist 110 and the hard mask 100, which likely give rise to a cleaner, better defined closure. Yet, one may, in variants, keep residual portions or the upper materials 100, 110. In other variants, the upper portion of the closure may be lapped.

If necessary, the substrate 500 obtained at the end of step S4 is furthermore diced, step S5, to obtain a narrow closure element, and this, prior to fixing it to the body.

The width of the hard mask 100 provided is preferably substantially equal to, or greater than the width of the transducer 22 (said widths measured along lateral direction y), for reasons discussed earlier.

In embodiments, the transfer of the topography of the photoresist 110 may be carried out so as for the substrate 500 eventually obtained to exhibit laterally recessed portions 51$_s$, as in FIG. 4. No reflow is strictly needed in this case. Still, a reflow process could be used to round the transition from the surface portion 58$s$ to the surface portion 51$s$. The lateral portions obtained will form non-skiving edges 51$_l$ at each end of a skiving edge 58$_l$.

In preferred embodiments, several of the aspects discussed above in reference to FIG. 8 can be advantageously combined, to obtain well-defined, monobloc closures. For instance, at step S1, a hard mask material 100 such as silicon dioxide is deposited on top of an AlTiC wafer 500 and patterned using photolithography and etching. At step S2: a photoresist mask 110 is deposited on the wafer 500, patterned and then heated to reflow the resist, which results in rounded or beveled edges in the resist. An etch process such as reactive ion etching is then used, step S3, to transfer the topography of the photoresist into the AlTiC substrate, which results in a rounded step, except in the region protected by the hard mask, where a sharp skiving edge is created, as shown in S3. At step S4: the remaining photoresist and hard mask are entirely stripped. Finally, at step S5, the wafer is diced into simple closures as illustrated in FIG. 2.

In variants, steps S1-S4 may be integrated in a process such as illustrated in FIG. 9, to obtain U-shaped closures, which help to achieve co-planarity of the top surface 58$_s$ of the closure with the tape-bearing surface 20. The process of FIG. 9 is now described in detail.

First, an AlTiC wafer 50$_w$ is provided that is coated with a photoresist 52$_p$, and lithographically patterned, step S10, to give rise to apertures. Then, S20: the pattern is transferred into the AlTiC wafer by reactive ion etching, creating an edge which will serve as a skiving edge 58$_l$, in operation. During steps 30-50: sections of the wafer are removed using repeated passes of a wafer saw 80 to cut partially through the depth of the wafer. At step S60: an additional deeper cut is made with the wafer saw to produce a region with a residual thickness of approximately 50 microns. At present, upper surfaces 52$_s$, 53$_s$ and 54$_s$ (compare with FIG. 4) of the step-like structure of the closure are defined. Step 70: individual, or "row bar", sections of closure are produced by dicing through the full thickness of the wafer.

Steps S1-S4 described in reference to FIG. 8 can for instance be used instead of step S10>(in a parallel fashion) or after step S70 (one closure at a time), so as to obtain non-skiving edges 51$_l$ (not visible in FIG. 9) in combination with (sharp) skiving edges 58$_l$>above the edge 51$_l$. The outer flanks 51, 55 may be lapped, to correct for differences in height, if necessary.

Next, regarding the closure assembly: a planar tape head body 5 (obtained from a wafer chip) and a closure are placed upside-down (i.e., with the write elements and the skiving edges down) on a flat reference surface, S80. Note that the dimensions of the distal flanks 55 (along x) may be slightly larger than those of the proximal flanks 51 to compensate for the difference of height induced by the intercalated process S1-S4. The two parts are then aligned, and glued S90, under a small applied load. The use of the reference surface ensures the co-planarity of the (planar) tape-bearing surface and the closure's top surfaces (upside-down). Using a glass plate (or any other transparent material) for the reference surface 70, the surfaces of the body and the closure can be viewed using an inverted microscope, to verify the co-planarity of the surfaces and adjust the alignment of the elements, as well as the applied load, if necessary, before gluing. After the glue 60 is cured S100, the free, distal flank 55 of the closure is removed S110 by breaking at the level of the thinned region 52.

If assembly is performed at the "row bar" level, the row bars can be diced into individual, planar servo-writers in a subsequent step (not shown).

Figure 10:
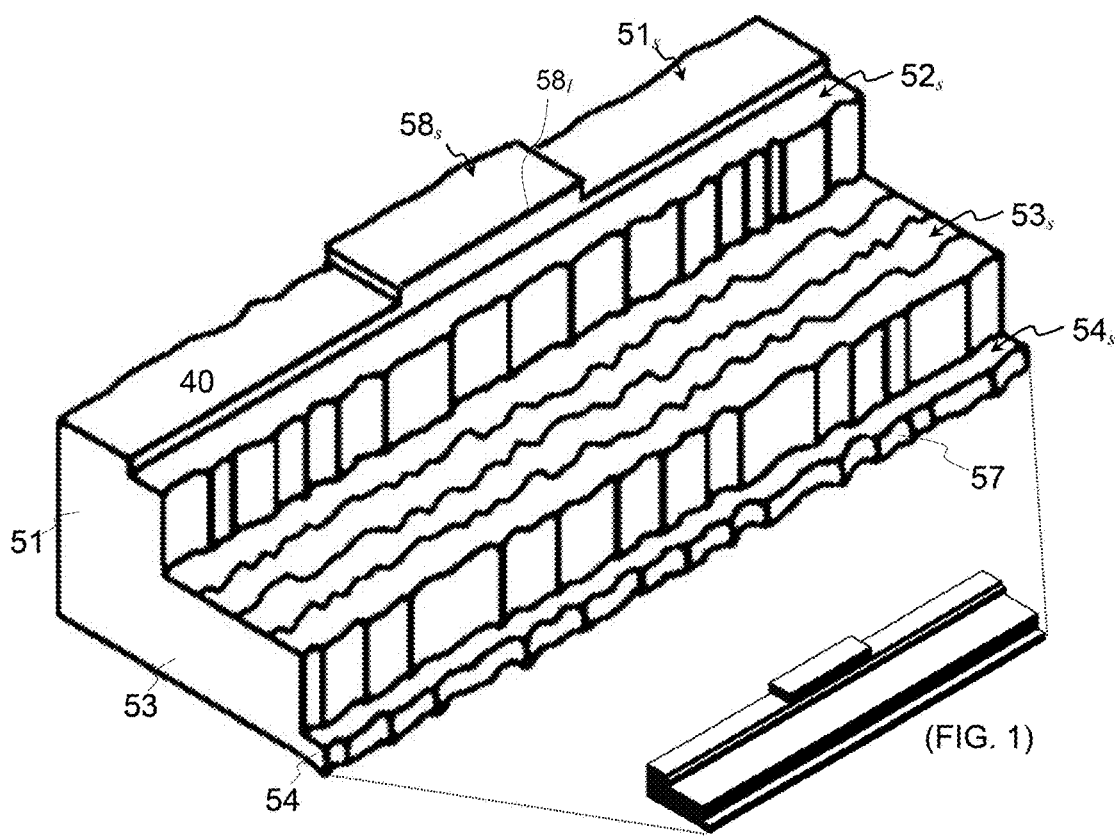
FIG. 10 depicts a 3D view of a closure element as obtained after step S110 of FIG. 9.

FIG. 10 schematically depicts an object as obtained after step S110 of FIG. 5 (only the closure is depicted though, for conciseness). As seen in FIG. 10, the transfer/etching processes described above in reference to steps S1-S4 of FIG. 8 and steps S10-S20 of FIG. 9 produces clean edges, while other edges and surfaces as obtained by sawing, steps S30-S60 of FIG. 9, are logically rougher.

While the present invention has been described with reference to a limited number of embodiments, variants and the accompanying drawings, it will be understood by those skilled in the art that various changes may be made and equivalents may be substituted without departing from the scope of the present invention. In particular, a feature (device-like or method-like) recited in a given embodiment, variant or shown in a drawing may be combined with or replace another feature in another embodiment, variant or drawing, without departing from the scope of the present invention. Various combinations of the features described in respect of any of the above embodiments or variants may accordingly be contemplated, that remain within the scope of the appended claims. In addition, many minor modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims. In addition, many other variants than explicitly touched above can be contemplated. For example, other materials than those explicitly mentioned may be used for the substrate 500 or 50$_w$.

What is claimed is:

1. A tape head comprising:
 a body, said body in turn comprising:
  a transducer, the transducer being a read or write element, respectively configured so as for the tape head to read from or write to a tape, in operation; and
  a tape-bearing surface, and
 a closure fixed on a leading side or a trailing side of the body;
  wherein said closure comprises a skiving edge vis-à-vis the transducer, the skiving edge adjoined by non-skiving edges; and
  wherein said closure has a top surface meeting the skiving edge, wherein the top surface is level with the tape-bearing surface.

2. The tape head according to claim 1, wherein a width of the skiving edge is at least equal to a width of the transducer, as measured along a lateral direction parallel to the tape-bearing surface and perpendicular to a longitudinal direction of circulation of the tape.

3. The tape head according to claim 1, wherein the non-skiving edges are respectively formed by two beveled or rounded portions of the closure, at each end of the skiving edge.

4. The tape head according to claim 1, wherein the non-skiving edges are respectively formed by two recessed portions, at each end of the skiving edge, wherein an external surface of each of the recessed portions faces the tape, in operation, and is recessed with respect to the top surface of the closure.

5. The tape head according to claim 4, wherein the external surface of each of the two recessed portions is beveled or rounded.

6. The tape head according to claim 1, wherein the closure is a monobloc closure.

7. The tape head according to claim 6, wherein the closure comprises aluminum-titanium carbide.

8. The tape head according to claim 1, wherein the tape head comprises two closures, and wherein:
 a first one of the closures is fixed on the leading side of the body; and
 a second one of the closures is fixed on the trailing side of the body,
 wherein each of the closures comprises:
  a skiving edge; and
  non-skiving edges, and
 wherein the skiving edge of each of the closures:
  is adjoined by non-skiving edges of said each of the closures; and
  extends vis-à-vis the transducer; and
 wherein, each of the closures has a top surface that meets the skiving edge of said each of the closures, the top surface being level with the tape-bearing surface.

9. The tape head according to claim 1, wherein the tape head comprises two or more transducers, and wherein the closure comprises two or more skiving edges vis-à-vis the two or more transducers, respectively, each of the two or more skiving edges adjoined by non-skiving edges.

10. The tape head according to claim 1, wherein the tape head is a planar tape head, the transducer being an in-plane transducer, whose top poles extend in-plane with the tape-bearing surface.

11. The tape head according to claim 1, wherein the transducer is a servo writer.

12. A tape head apparatus for carrying out at least one of recording and reproducing multi-track tapes, said tape head apparatus comprising a tape head, said tape head in turn comprising:
 a body, said body in turn comprising:
  a transducer, the transducer being a read or write element, respectively configured so as for the tape head to read from or write to a tape, in operation; and
  a tape-bearing surface, and
 a closure fixed on a leading side or a trailing side of the body;
  wherein said closure comprises a skiving edge vis-à-vis the transducer, the skiving edge adjoined by non-skiving edges; and
  wherein said closure has a top surface meeting the skiving edge, wherein the top surface is level with the tape-bearing surface.

13. A method of fabrication of a tape head, the method comprising:
 providing a substrate;
 patterning a hard mask on a first portion of the substrate;
 depositing a photoresist on a second portion of the substrate, which second portion includes said first portion, so as for a front of the photoresist to substantially meet a front edge of the patterned hard mask, the front edge extending along a lateral direction of the substrate, the lateral direction parallel to the tape-bearing surface and perpendicular to a longitudinal direction of circulation of the tape;
 transferring a topography of the reflowed photoresist into the substrate to obtain a substrate with a skiving edge extending along said lateral direction, wherein the skiving edge is adjoined by non-skiving edges, the substrate obtained forming a closure having a top surface meeting the skiving edge; and fixing the closure to a body of the tape head, said body in turn comprising:

a transducer, the latter being a read or write element, respectively configured so as for the tape head to read from or write to a tape, in operation; and a tape-bearing surface, wherein, at fixing, the closure is fixed on the leading side or the trailing side of the body, so as for the top surface of the closure to be level with the tape-bearing surface; and the skiving edge to be vis-à-vis the transducer.

14. The method according to claim 13, wherein depositing the photoresist further comprises heating the deposited photoresist to reflow it, so as for the front of the reflowed photoresist to exhibit beveled or rounded portions on opposite sides of the patterned hard mask, such that the skiving edge subsequently obtained is adjoined by two beveled or rounded portions, one at each end of the skiving edge, said beveled or rounded portions forming said non-skiving edges.

15. The method according to claim 13, further comprising, after transferring and prior to fixing, stripping remaining parts of the photoresist and the hard mask.

16. The method according to claim 15, further comprising, after stripping and prior to fixing, dicing the substrate to obtain the closure.

17. The method according to claim 13, wherein a width of the hard mask provided is substantially equal to or greater than the width of the transducer, said widths measured along said lateral direction.

18. The method according to claim 13, wherein transferring the topography of the photoresist is carried out so as for the substrate eventually obtained to have two recessed portions forming said non-skiving edges, one at each end of the skiving edge, wherein an external surface of each of the recessed portions is recessed with respect to the top surface of the closure.

19. The method according to claim 13, wherein the closure formed comprises aluminum-titanium carbide.

20. The method according to claim 13, wherein the hard mask patterned comprises silicon dioxide.

* * * * *